H. LEAP.
RESILIENT WHEEL.
APPLICATION FILED NOV. 18, 1910.
1,014,884.
Patented Jan. 16, 1912.
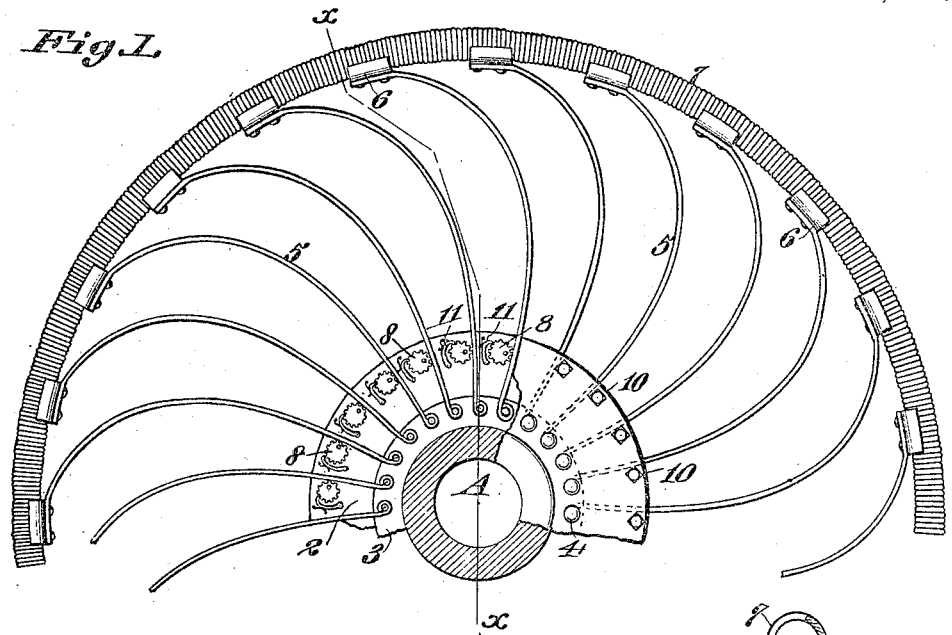
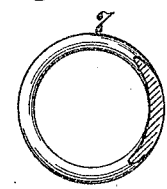
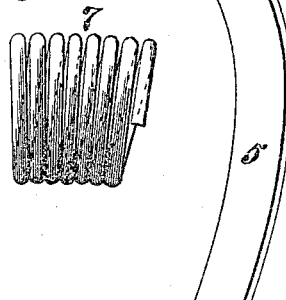
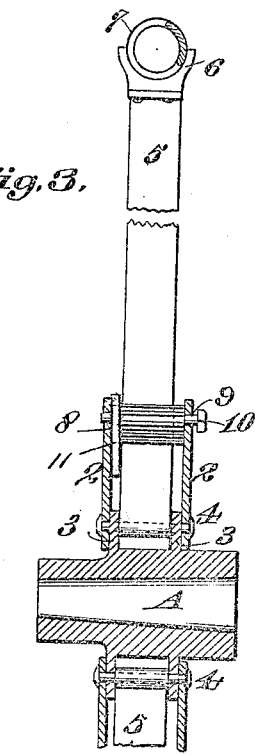
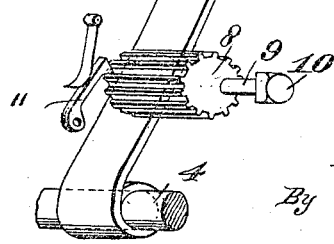
Witnesses,
Charles Pickles
R. S. Berry
Inventor;
Harry Leap,
By Geo. H. Strong.
Atty

UNITED STATES PATENT OFFICE.

HARRY LEAP, OF CAMP MEEKER, CALIFORNIA.

RESILIENT WHEEL.

1,014,884.  Specification of Letters Patent.  Patented Jan. 16, 1912.

Application filed November 18, 1910. Serial No. 592,973.

*To all whom it may concern:*

Be it known that I, HARRY LEAP, citizen of the United States, residing at Camp Meeker, in the county of Sonoma and State of California, have invented new and useful Improvements in Resilient Wheels, of which the following is a specification.

This invention relates to a resilient wheel and particularly pertains to a resilient vehicle wheel having yieldable spokes and a flexible rim.

It is the object of this invention to provide a resilient wheel having yieldable spokes in which the tension or yieldability of the spokes may be adjusted to suit the load of the vehicle supported thereon.

Another object is to provide a spring wheel having a flexible rim, which, in connection with the resiliency of the yieldable spokes produces a vehicle wheel of such nature that resilient tires, such as pneumatic or solid rubber tires, are not required, thus dispensing with an expensive feature now generally employed.

A further object is to provide a resilient wheel which is simple in construction, economical in manufacture, durable and efficient, and which is particularly adapted for use on automobiles and like road vehicles.

The invention consists of the parts and the combination and construction of parts hereinafter more fully described and claimed having reference to the accompanying drawings, in which—

Figure 1 is a side elevation, partly in section, of the upper half of a wheel constructed in accordance with the present invention. Fig. 2 is a detail in perspective of a yieldable spoke and the adjustment for regulating the tension thereof. Fig. 3 is an enlarged sectional view on the line X—X, Fig. 1. Fig. 4 is a detail of a modified form of the resilient rim. Fig. 5 is an enlarged cross section of the resilient rim. Fig. 6 is a side elevation of a portion of said rim on an enlarged scale.

In the drawings A represents the hub of the wheel, which may be the ordinary hub in common use. Parallel flange plates 2 are mounted on the hub and suitably separated; in this case being shown as secured to the spoke flanges 3 on the hub A by means of bolts 4 which pass through the plates 2 and flanges 3 and extend across the spoke socket between the flanges 3.

The spokes 5 of the wheel are formed of stiff plate springs constructed of flat steel bars and curved similar to the ordinary elliptic spring and thus producing spokes that are yieldable and resilient. One end of each spring spoke 5 is disposed between the plates 2 and flanges 3 and is secured to the bolts 4. The outer end of each spring spoke 5 is rigidly secured to and carries a shoe 6 which is semi-circular in cross section and arcual in long section, on a radius corresponding to that of the wheel. These shoes 6 on the outer ends of the spokes 5 form collectively a seat for a continuous flexible rim 7, which rests loosely therein, that is, not riveted or attached to the shoes 6. This rim 7 forms the tread of the wheel and in one sense may be termed a tire, and is constructed of a continuous annular steel coil or helical spring, or of a series of strands wound upon each other in any suitable manner, such as is common in cable construction. The rim 7, may be in fact, either an annular helical spring or the ordinary steel cable of commerce, or in some instances heavy fibrous rope or hawser may be employed; the essential feature being to obtain a tread built up of interwoven or wound strands having a flexible nature.

The tension of the curved spring spokes 5 is in an outward direction; the spokes being sprung into position, which stretches the flexible rim 7 taut and opposes radial pressure.

Means are provided for regulating the tension of the spring spokes 5 to adapt the wheel to the weight of the vehicle supported thereon. This is accomplished by means of a toothed cylinder 8, which is eccentrically mounted on a stem 9, and disposed between the flanges 2 near the periphery thereof and adjacent the back of each spring spoke 5. The stem 9 passes through the flange plate 2 and is provided with a head 10, adapted to be engaged by a wrench and turned to the right or left so as to cause the toothed cylinder 8, which is fixed on the stem 9 to press against the front of the spring spoke 5. The cylinder 8 being eccentrically mounted, different degrees of pressure will be brought to bear on the front of spring spoke 5 according to the position in which the cylinder 8 is disposed.

The cylinder 8 is toothed in such manner that the faces of two teeth will contact the spoke at one time, thus presenting a flat bearing and preventing the eccentric cylinder being easily turned.

A spring pawl 11 is mounted on a plate 2 adjacent each cylinder 8 and is adapted to engage the teeth thereof to prevent the latter being turned by sudden jolting or jarring of the wheel, or any other suitable device for the purpose may be employed.

From the foregoing, it will be seen that I have produced an adjustable, resilient shock absorbing wheel which is simple, practical and not liable to get out of order, needs no tires other than the rim 7 and may be readily assembled and repaired.

Having thus described my invention what I claim and desire to secure by Letters Patent is—

1. The combination in a wheel of a hub having parallel separated flange plates, a resilient rim, flat curved elastic spokes having eyes seated between the flanges, bolts passing through the flanges and eyes, segmental shoes fixed to the outer ends of the spokes and forming approximately continuous seats for the resilient rim, and means for varying the tension of the spokes.

2. The combination in a wheel of a hub having parallel separated flange plates, a resilient rim, flat curved elastic spokes having eyes seated between the flanges, bolts passing through the flanges and eyes, segmental shoes fixed to the outer ends of the spokes and forming approximately continuous seats for the resilient rim, and means for varying the tension of the spokes, said means consisting of eccentrically journaled cylinders turnable to vary the pressure upon and change the curvature of the spokes.

3. The combination in a wheel of a flanged hub, a rim, flat eccentrically curved elastic spokes having concaved seats at the outer end in which the rim fits, turnable attachments to the hub, and means for varying the curvature and tension of the spokes, said means consisting of cylinders eccentrically journaled between the hub flanges, said cylinders formed to provide separated bearing points against the spoke surface.

4. The combination in a wheel of a flanged hub, a rim, flat eccentrically curved elastic spokes having concaved seats at the outer end in which the rim fits, turnable attachments to the hub, means for varying the curvature and tension of the spokes, said means consisting of cylinders eccentrically journaled between the hub flanges, said cylinders formed to provide separated bearing points against the spoke surface, and means for turning the cylinders.

5. The combination in a wheel of a flanged hub, a rim, flat eccentrically curved elastic spokes having concaved seats at the outer end in which the rim fits, turnable attachments to the hub, means for varying the curvature and tension of the spokes, said means consisting of cylinders eccentrically journaled between the hub flanges, said cylinders formed to provide separate bearing points against the spoke surface, means for turning the cylinders, and means for locking said cylinders against movements.

In testimony whereof I have hereunto set my hand in the presence of two subscribing witnesses.

HARRY LEAP.

Witnesses:
CHARLES EDELMAN,
C. C. COOK.